United States Patent
Li et al.

(10) Patent No.: US 9,754,153 B2
(45) Date of Patent: Sep. 5, 2017

(54) METHOD AND APPARATUS FOR FACIAL IMAGE PROCESSING

(71) Applicant: Nokia Technologies Oy, Espoo (FI)

(72) Inventors: Jiangwei Li, Beijing (CN); Kongqiao Wang, Beijing (CN); He Yan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 14/086,235

(22) Filed: Nov. 21, 2013

(65) Prior Publication Data

US 2014/0147003 A1 May 29, 2014

(30) Foreign Application Priority Data

Nov. 23, 2012 (CN) .......................... 2012 1 0496169

(51) Int. Cl.
*G06K 9/00* (2006.01)
*G06T 7/155* (2017.01)
(Continued)

(52) U.S. Cl.
CPC ....... *G06K 9/00234* (2013.01); *G06K 9/4652* (2013.01); *G06K 9/00268* (2013.01);
(Continued)

(58) Field of Classification Search
CPC ........... G06K 9/00234; G06K 9/00221; G06K 9/00268; G06K 9/0014; G06K 9/4652;
(Continued)

(56) References Cited

U.S. PATENT DOCUMENTS 6,650,778 B1 * 11/2003 Matsugu ............ G06K 9/00362
382/190
7,840,066 B1 * 11/2010 Chen .................... G06T 5/002
382/168
(Continued)

FOREIGN PATENT DOCUMENTS

CN 1521695 A 8/2004
CN 1763765 A 4/2006
(Continued)

OTHER PUBLICATIONS

Gong et al., A robust framework for face contour detection from clutter background, 2010, Int J Mach Learn Cyber, 3, pp. 111-118.*
(Continued)

*Primary Examiner* — Kenny Cese
(74) *Attorney, Agent, or Firm* — Alston & Bird LLP (57) ABSTRACT

The present invention provides a method for image processing, a corresponding apparatus and a computer program product. The method comprises performing face detection of an image, obtaining a coarse face segmentation region of at least one face and a contour edge of the at least one face based on the face detection; and adjusting the coarse face segmentation region based on the contour edge to obtain a fine face segmentation region. By using the method, corresponding apparatus and computer program product of the present invention, the coarse face region in an image can be precisely segmented, which provides a good basis for the subsequent image processing based on the fine face segmentation region.

27 Claims, 7 Drawing Sheets

(51) Int. Cl.
  *G06T 7/13* (2017.01)
  *G06T 7/11* (2017.01)
  *G06K 9/46* (2006.01)
  *G06T 7/149* (2017.01)

(52) U.S. Cl.
  CPC . *G06T 7/11* (2017.01); *G06T 7/13* (2017.01); *G06T 7/149* (2017.01); *G06T 2207/30201* (2013.01)

(58) Field of Classification Search
  CPC ......... G06T 7/0081; G06T 2207/30201; G06T 2207/10024; G06T 2207/20144; G06T 7/0083; G06T 2207/30088; G06T 2207/20064; G06T 7/11; G06T 7/13; G06T 7/149
  See application file for complete search history.

(56) References Cited

U.S. PATENT DOCUMENTS

| | | | |
|---|---|---|---|
| 7,856,150 B2 | 12/2010 | Li et al. | |
| 8,139,854 B2 | 3/2012 | Oh et al. | |
| 2008/0112622 A1 | 5/2008 | Kwak et al. | |
| 2008/0240571 A1* | 10/2008 | Tian | G06K 9/00234 382/190 |
| 2009/0226044 A1* | 9/2009 | Ngan et al. | 382/115 |
| 2009/0245679 A1* | 10/2009 | Ohwaki | G06T 5/20 382/260 |
| 2010/0021056 A1 | 1/2010 | Chen | |
| 2010/0097485 A1 | 4/2010 | Lee et al. | |
| 2010/0177981 A1 | 7/2010 | Wang et al. | |
| 2010/0215238 A1* | 8/2010 | Lu | G06T 7/0083 382/131 |
| 2011/0222728 A1 | 9/2011 | Xiao et al. | |
| 2012/0301020 A1* | 11/2012 | Tallamraju | G06K 9/4604 382/165 |
| 2013/0094768 A1* | 4/2013 | Ye | G06K 9/6209 382/199 |
| 2014/0270540 A1* | 9/2014 | Spector et al. | 382/199 |

FOREIGN PATENT DOCUMENTS

| | | |
|---|---|---|
| CN | 101971190 A | 2/2011 |
| CN | 102567998 A | 7/2012 |
| EP | 1447773 A2 | 8/2004 |

OTHER PUBLICATIONS

Achuthan et al., Wavelet energy-guided level set-based active contour: A segmentation method to segment highly similar regions, 2010, Computers in Biology and Medicine 40, pp. 608-620.*
Gong et al., "A robust framework for face contour detection from clutter background," 2010, Int J Mach Learn Cyber, 3, pp. 111-118.*
Achuthan et al., "Wavelet energy-guided level set-based active contour: A segmentation method to segment highly similar regions," 2010, Computers in Biology and Medicine 40, pp. 608-620.*
International Search Report and Written Opinion received for corresponding Patent Cooperation Treaty Application No. PCT/FI2013/051080, dated Mar. 27, 2014, 13 pages.
Gong et al., "A Robust Framework for Face Contour Detection from Clutter Background", International Journal on Machine Learning and Cybernetics, No. 3, Aug. 31, 2011, pp. 111-118.
Ma et al., "Face Segmentation Algorithm Based on ASM", IEEE Int. Conf. on Intelligent Computing and Intelligent Systems, Nov. 2009, vol. 4, pp. 495-499.
Li et al., "Face Contour Shape Extraction with Active Shape Models Embedded Knowledge", IEEE Int. Conf. on Signal Processing, Aug. 2000, vol. III, pp. 1347-1350.
Office Action and Search Report from corresponding Chinese Application No. 201210496169.1 dated Jan. 29, 2016.
Wu, Li-Fang et al.; "Face Segmentation Based on Curve Fitting"; Chinese Journal of Computers; No. 26, No. 7; Jul. 2003; pp. 893-897.
Sobottka, Karin, Pittas, Joannis, "*A novel method for automatic face segmentation, facial feature extraction and tracking*", Signal Processing: Image Communication, vol. 12, Issue 3, Jun. 1998, pp. 263-281.
Chai, Douglas and King, N.N., "*Face Segmentation Using Skin-Color Map in Videophone Applications*", IEEE Transactions on Circuits and Systems for Video Technology, vol. 9, No. 4, Jun. 1999.
Adipranata, Rudy et al., "*Fast Method for Multiple Human Face Segmentation in Color Image*", International Journal of Advanced Science and Technology, vol. 3, Feb. 2009.
Prakash, J. and Rajesh, K., "*Human Face Detection and Segmentation using Eigenvalues of Covariance Matrix, Hough Transform and Raster Scan Algorithms*", World Academy of Science, Engineering and Technology, 2008.
Face Skin Analyzer System Magic Mirror [online] [retrieved Sep. 6, 2012]. Retrieved from the Internet: <URL: http://cgem168.en.alibaba.com/product/327208619-210219248/face_Skin_analyzer_System_magic_mirror.html>. 6 pages.
RGB and UV Lighting Big Magic Mirror for Skin Analyser Machine CE Approval XM-T3 [online] [retrieved Sep. 6, 2012]. Retrieved from the Internet: <URL: http://www.tjskl.org.cn/products-search/cz50933e1/rgb_and_uv_lighting_big_magic_mirror_for_skin_analyser_machine_ce_approval_xm_t3-pz535e6a7.html>. 4 pages.
Professional Skin Analyzer Magic Mirror Skin Diagnosis System with Trolley [online] [retrieved Sep. 6, 2012]. Retrieved from the Internet: <URL: http://tingmei.en.ecplaza.net/professional-skin-analyzer-magic-mirror--313060-2421934.html>. 3 pages.
WT-03-B RGB/UV/PL 3 Light Magic Face Analyzer [online] [retrieved Sep. 6, 2012]. Retrieved from the Internet: <URL: http://www.alibaba.com/product-gs/561270595/WT_03_B_RGB_UV_PL.html?s=p>. 4 pages.
Partial Supplementary European Search Report from corresponding European Patent Application No. 13857311.8 dated Jun. 20, 2016.
Perlibakas V Ed—Calderara Simone Bandini Stefania Cucchiara Rita: "Automatical Detection of Face Features and Exact Face Contour"; Pattern Recognition Letters, Elsevier, Amsterdam, NL; vol. 24, No. 16; Dec. 1, 2003; pp. 2977-2985; XP004463259.
Office Action for Chinese Application No. 2012104961691 dated Sep. 18, 2016.
Office Action for European Application No. EP 13 85 7311 dated Sep. 26, 2016.

* cited by examiner

METHOD AND APPARATUS FOR FACIAL IMAGE PROCESSING

FIELD OF THE INVENTION

Exemplary and non-limiting embodiments of the present invention generally relate to image processing, and more specifically, to a method and apparatus for facial image processing.

BACKGROUND OF THE INVENTION

With the development of mobile camera technology, more and more users use mobile devices to take photos in their daily lives, and send the taken photos or pictures to friends and colleagues via a wireless network, or release them in blogs or social networks, so as to share them with friends and colleagues in time. Before releasing the photos, many users (especially female users) want to perform some facial image processing on these photos so as to obtain various effects. It imposes higher requirements on the current image processing techniques.

One challenge that the current image processing techniques face is how to automatically and precisely segment a face from an image comprising the face and surrounding areas, as a basis for further facial image processing. Segmenting a fine face region is a benefit for realizing subsequent various satisfactory image processing, such as facial image editing, effecting and the like. If some background images are introduced or some face regions are missed during the face segmentation from the image, only a coarse face segmentation region as shown in FIG. 1 will be obtained.

Figure 1:
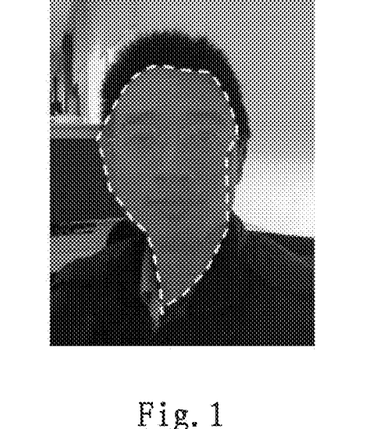
FIG. 1 exemplarily illustrates a picture subject to coarse face region segmentation obtained by using the prior art.

As shown in FIG. 1, the detected face segmentation region is surrounded by a dotted line. It can be seen from the face segmentation region surrounded by the dotted line that, due to background illumination or surrounding color's proximity when taking photos, the left side of the segmentation region comprises a small non-face region, and the right side excludes a partial face region near the left ear from the face segmentation region. Obviously, such a result of the face segmentation is coarse, and subsequent processing based on such a coarse face segmentation region usually leads to severe distortion in the resulting face image, or an unacceptable effect.

The difficulty for fine face region segmentation lies in a variety of objects in a picture, a variety of devices for photo taking and a variety of environmental illumination when photo taking. In practice, most of the current solutions are insufficient to process pictures having various facial features, such as, a picture of a white person or a black person, front view or side view, indoor or outdoor, a young person or an old person, and pictures with different definition or ambiguity. In particular, complicated and varying shooting conditions may incur unbalanced color distribution on a face, which may blur the image. This is why the face segmentation of a picture based only on a luminance cue and a skin color cue does not generate a satisfactory effect. Further, color similarity between a face region and background objects also makes it difficult to differentiate color information in segmenting the whole face region. Thus, how to obtain a reliable and fine face segmentation region becomes a primary issue in facial image processing.

SUMMARY OF THE INVENTION

To alleviate or overcome the above mentioned technical problem, embodiments of the present invention provide an efficient solution for facial image segmentation that enables further refinement of a coarse face segmentation region so as to obtain a fine face segmentation region with high quality and precision. Based on the fine face segmentation region, embodiments of the present invention also propose to perform further image processing on the fine face segmentation region so as to meet requirements of different users on image effects.

To this end, an embodiment of the present invention provides a method. The method comprises performing face detection of an image. The method further comprises obtaining a coarse face segmentation region of at least one face and a contour edge of the at least one face based on the face detection. Further, the method comprises adjusting the coarse face segmentation region based on the contour edge to obtain a fine face segmentation region.

Another embodiment of the present invention provides an apparatus. The apparatus comprises at least one processor and at least one memory containing computer program code. The processor and the memory are configured to, with the processor, cause the apparatus to at least perform face detection of an image. The processor and the memory are configured to, with the processor, cause the apparatus to at least obtain a coarse face segmentation region of at least one face and a contour edge of the at least one face based on the face detection. Further, the processor and the memory are configured to, with the processor, cause the apparatus to at least adjust the coarse face segmentation region based on the contour edge to obtain a fine face segmentation region.

Yet another embodiment of the present invention provides an apparatus. The apparatus comprises a detecting device for performing face detection of an image. The apparatus further comprises an obtaining device for obtaining a coarse face segmentation region of at least one face and a contour edge of the at least one face. Further, the apparatus comprises an adjusting device for adjusting the coarse face segmentation region based on the contour edge to obtain a fine face segmentation region.

A further embodiment of the present invention provides a computer program product. The computer program product comprises at least one computer readable storage medium having a computer readable program code portion stored therein, wherein the computer readable program code portion is used for implementing the method for image processing according to embodiments of the present invention.

By adjusting the coarse face segmentation region based on the contour edge, embodiments of the present invention can significantly improve precision of the face region segmentation and thereby provides a good basis for the subsequent face image processing.

BRIEF DESCRIPTION OF THE DRAWINGS

When reading the following detailed description of the non-limiting embodiments by referring to the drawings, other features, objectives and advantages of the present invention will become apparent. In the drawings, the same and similar reference numerals refer to the same or similar devices or method steps, wherein.

DETAILED DESCRIPTION OF EMBODIMENTS

Exemplary embodiments of the present invention provide a method and apparatus for efficient face region segmentation, and a method and apparatus for "beautifying" (including whitening and smoothing) a fine face segmentation region obtained by using the method and apparatus. In order to obtain the fine face segmentation region, the exemplary embodiments of the present invention propose that coarse segmentation is firstly performed on a face in an image using face detection, so that a coarse face segmentation region is obtained. Next, the face in the image is processed to obtain a face contour edge of the face region. Subsequently, the above two are effectively combined to obtain a fine face segmentation region.

In some embodiments, the present invention proposes to adjust the coarse face segmentation region in a two-dimensional space (along a lateral or longitudinal direction) with the contour edge as a reference, so as to fill the area within the contour edge with the coarse face segmentation region, so that the fine face segmentation region is obtained. In some other embodiments, the present invention also proposes to perform an interpolation operation, when the contour edge is disconnected, between the disconnected areas so that the fine face segmentation region is obtained.

Next, detailed description of embodiments of the present invention will be provided with reference to the drawings.

Figure 2:
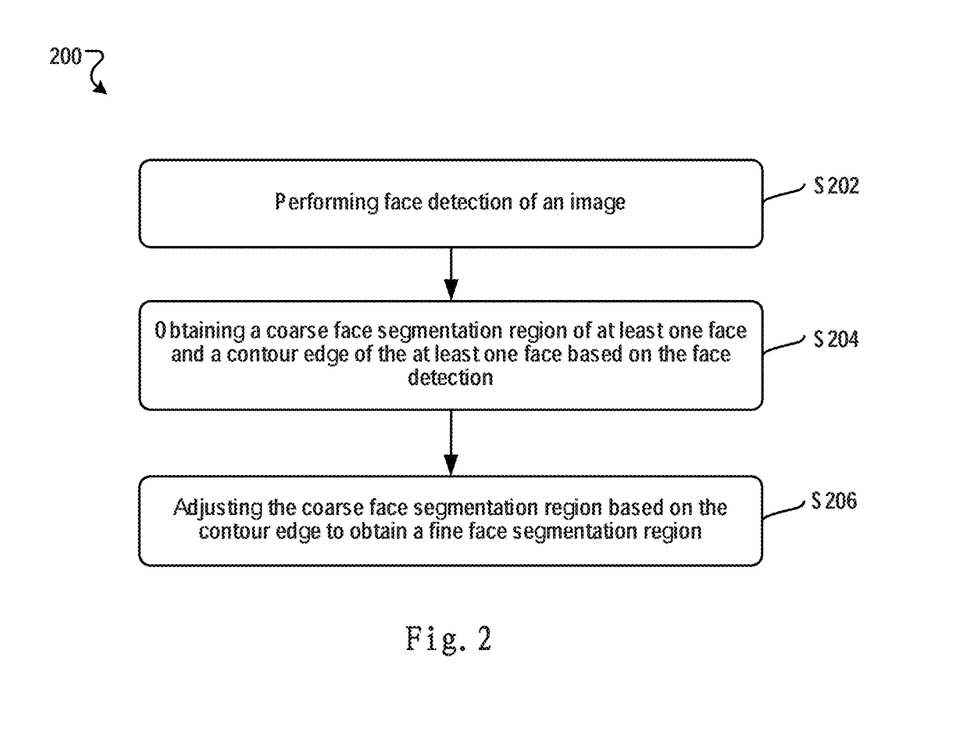
FIG. 2 is a simplified flow chart exemplarily illustrating a method for face image processing according to an embodiment of the present invention.

FIG. 2 is a simplified flow chart exemplarily illustrating a method 200 for facial image processing according to an embodiment of the present invention. As shown in FIG. 2, in step S202, method 200 performs face detection of an image. Subsequently, in step S204, method 200 obtains a coarse face segmentation region of at least one face and a contour edge of the at least one face based on the face detection. Although not illustrated, in an embodiment, method 200 builds a skin color model by using a partial region of the at least one face, and subsequently applies the built skin color model (such as the model illustrated by a picture P406 in FIG. 4) to the at least one face, so that the coarse face segmentation region of the at least one face is obtained. In another embodiment, method 200 determines the face contour edge by using a wavelet transform (such as the Haar wavelet convolution algorithm).

It should be understood that the above processing for obtaining the coarse face segmentation region and the face contour edge is merely exemplary and illustrative, and the embodiments of the present invention are not limited to the specific processing manner disclosed herein. Those skilled in the art may adopt other suitable (existing or to be developed) methods to obtain the coarse face segmentation region and the face contour edge based on the teaching provided herein.

Upon obtaining the coarse segmentation region of the at least one face and the contour edge of the at least one face, method 200 proceeds to step S206, wherein method 200 adjusts the coarse face segmentation region based on the contour edge to obtain a fine face segmentation region. In one embodiment, method 200 adjusts the coarse face segmentation region along at least one of the lateral and longitudinal directions with the contour edge as a reference, so as to fill the whole contour with the coarse face segmentation region, so that the fine face segmentation region is obtained.

Further, in one embodiment, method 200 detects whether edge pixels of the coarse face segmentation region deviate from the contour edge within a preset position adjusting range (for example, within a certain threshold range), and when detecting that the deviation is within the position adjusting range, the method 200 adjusts the deviated edge pixels to points on the contour edge aligning with these pixels in the lateral or longitudinal direction. When detecting that the deviation exceeds the position adjusting range, method 200 regards the deviation as a protrusion outstretching from the contour edge, and removes the protrusion so as to obtain the fine face segmentation region.

In most circumstances, the contour edge determined in step S204 is continuous or closed, whereas in practical operations, it might be broken or disconnected due to various potential reasons. To this end, in an embodiment, method 200 further detects whether the contour edge is disconnected, and if so, performs an interpolation operation between two disconnected end points. For example, a linear or non-linear interpolation operation along the trend of the contour edge may be adopted to fill the disconnected edge, so as to obtain the fine face segmentation region.

Fine segmentation of the face region in a picture can be achieved by using various implementations of the above method 200 and its variations or expansions. Such fine segmentation may not only effectively eliminate interfering information or image noise from the background, but also preserve facial details as many as possible. In addition, such a fine face segmentation region provides a good material basis for the subsequent image processing (including whitening and smoothing) of the present invention.

Although not shown in FIG. 2, as to the whitening operation, method 200 further determines grey values of all pixels within the fine face segmentation region, divides all pixels into at least two classes based on the grey values, and adjusts the grey values of each class of pixels according to different levels, to enable the whitening processing on the fine face segmentation region. Simply speaking, method 200 will perform the whitening processing to different degrees on the pixels with different grey values, so that the initial grey pixels will not become too white, and the initial white pixels will become whiter, and thereby contrast of the face in the image is enhanced.

According to an embodiment, method 200 take statistics of the grey values of all pixels within the fine face segmentation region, and determines at least one threshold value for the grey values based on the statistics, and thereby divides all pixels into aforesaid at least two classes based on the at least one threshold value. Regarding the at least one threshold value, in one embodiment, method 200 ranks the grey values of all pixels within the fine face segmentation region, selects a predetermined number of pixels in sequence, and averages the grey values of the selected pixels so as to determine the average value as the at least one threshold value.

Figure 6:
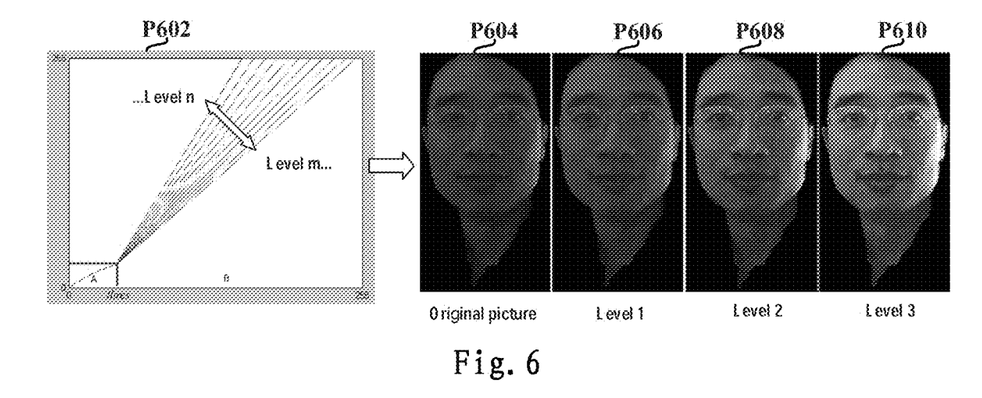
FIG. 6 is a schematic diagram exemplarily illustrating performing whitening processing on a face region using the fine face segmentation region obtained according to an embodiment of the present invention.

It can be seen that the above threshold value determining manner is specific to each face. Thus, the face whitening is more pertinent. In addition, to achieve different whitening effects, in one embodiment, method 200 further selects different (whitening) levels for each class of pixels (for example, pictures P606, P608 and P610 in FIG. 6 show different levels of whitening effects), and the levels can be adjusted by parameters. Such a setting is helpful to provide a user with a selection for different whitening effects, and the user may preview the pictures through a preview function and selects a desired whitening effect in the end.

The whitening operation on the fine face segmentation region is discussed above, and the subsequent discussion will focus on the smoothing processing on the obtained fine face segmentation region. According to an embodiment of the present invention, after obtaining the fine face segmentation region, method 200 further determines grey value differences between each pixel within the fine face segmentation region and respective neighboring pixels in a neighboring region, compares each grey value difference with a predetermined threshold value to determine smoothing weights of each pixel with regard to respective neighboring pixels, wherein the smoothing weight value is inversely proportional to the grey value difference, and adjusts the grey value of each pixel based on the grey values of the respective neighboring pixels, the smoothing weights, and spatial distances between the each pixel and the respective neighboring pixels, so as to realize the smoothing processing on the fine face segmentation region.

Regarding the above smoothing weights, the smoothing processing of the embodiments of the present invention takes the grey value of each pixel and grey values of pixels in its neighboring region into consideration. The greater the difference between grey values of two pixels is, the more likely that regions containing the two pixels might have an edge in-between, and the edge is an area that the smoothing operation will try to avoid. On such a basis, it can be deemed that the neighboring pixels contribute little to the smoothing operation on the pixels to be smoothed. Thus, a less weight is given to the pixel to be smoothed for that neighboring pixel. Conversely, a more weight is to be given.

Regarding the selection of the above predetermined threshold value, in an embodiment, method 200 calculates gradient values of all pixels within the fine face segmentation region, ranks the gradient values of all pixels and selects a predetermined number of pixels in sequence, and averages the gradient values of the selected pixels so as to set the average value as the predetermined threshold value. Similarly to the whitening processing, such a threshold setting is more specific and pertinent to each picture, so that a better smoothing effect can be achieved.

The operation of smoothing processing on the fine face segmentation region is discussed above. It should be noted that the smoothing processing can be performed immediately after the step S206, and can also be performed before or after the whitening processing, which is up to different preferences of users or settings.

Figure 3:
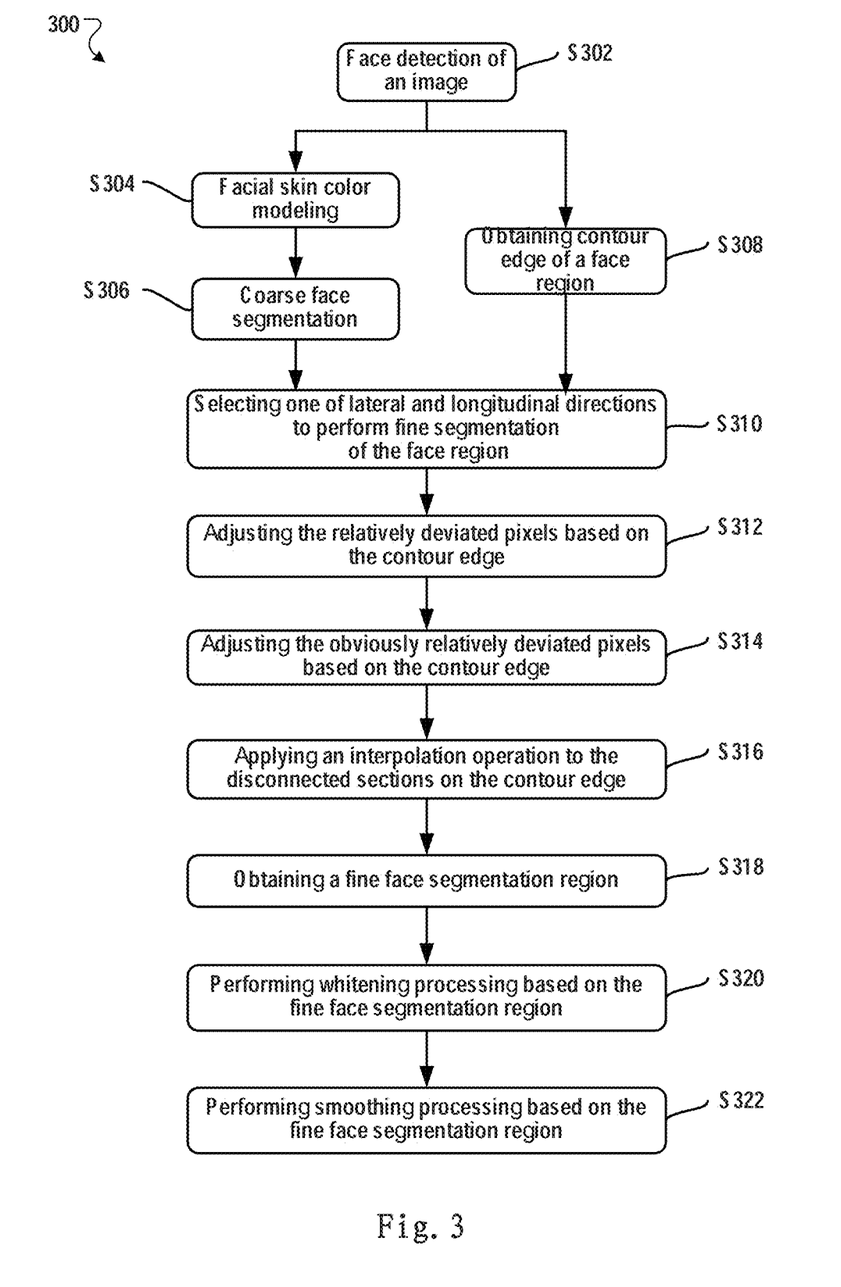
FIG. 3 is a detailed flow chart exemplarily illustrating a method for face image processing according to an embodiment of the present invention.

FIG. 3 is a detailed flow chart exemplarily illustrating a method 300 for facial image processing according to an embodiment of the present invention. As shown in FIG. 3, in step S302, method 300 performs face detection of an image to be processed. It will be understood by those skilled in the art that, as to any arbitrarily given image containing faces therein, an edge box may be detected by using a face detecting model. In addition to the detection of the edge box, it should be extended as well, so that the extended box includes not only the face region but also a neck region connected to the face (as illustrated by picture P402 in FIG. 4, description will be provided with reference to FIG. 4 later), which may facilitate the subsequent facial image processing.

Next, method 300 proceeds to step S304, where method 300 builds a skin color model for the detected face. After obtaining the skin color model, in step S306, method 300 performs coarse face segmentation on the image to obtain a coarse face segmentation region. The processes of the skin color modeling and the coarse face segmentation would be detailed by referring to FIG. 4 later.

In step S308, method 300 performs the processing of obtaining a contour edge of the face region in parallel with the processing steps S304 and S306 of the coarse face segmentation. In an exemplary embodiment of the present invention, a wavelet transform (such as the Haar wavelet transform) may be performed to calculate and thus obtain the contour edge of a face which is close to or overlaps with the actual face contour. Although in certain circumstances, the contour edge might be disconnected due to the quality of the image or other potential reasons.

As described above, although the coarse face segmentation region can be obtained by using the skin color model, the result is not sufficient to assist in facial image processing tasks. Generally, coarseness of the face segmentation region may be attributed to that (1) some background images are mistakenly categorized as the skin; and (2) some face regions are missed during the segmentation. Actually, complex and changing illumination conditions may lead to unbalanced color distribution on a human face, which is difficult to be overcome by processing based merely on the skin color model. Thus, embodiments of the present invention propose to refine the obtained coarse face segmentation region so as to obtain a satisfactory fine face segmentation region.

To this end, in step S310, method 300 selects at least one of the lateral (or x direction) or longitudinal (or y direction) direction to perform fine segmentation of the face region (or referred to as coarse face segmentation region refinement). In some embodiments of the present invention, the refining process adjusts the coarse face segmentation region obtained from step S306 based on strong edge responses on the face contour edge obtained from step S308.

Specifically, first, in step S312, method 300 adjusts the relatively deviated pixels based on the face contour edge. Here, the relative deviation can be set within a certain threshold range, so as to apply the processing of step S314 to the pixels exceeding the threshold range. Specific operations of step S312 will be exemplarily described by referring to FIG. 5*a* in the following.

When method 300 proceeds to step S314, it will detect whether there are pixels obviously deviating from the face contour edge in the picture obtained from step S312. Here, the obvious deviation means that the deviation has exceeded the previously set searching range, namely, a condition where the adjustment cannot be achieved by using step S312. The obvious deviation can be a protrusion outstretching from the face region caused by mistaking the background of the similar color with the skin as the face region. By executing step S314, obviously deviated pixels can be adjusted based on the contour edge. Specific operations of step S314 will be exemplarily described by referring to FIG. 5b in the following.

When method 300 proceeds to step S316, it will detect whether the contour edge is disconnected. As those skilled in the art may understand, during the actual calculation of the contour edge, it might happen that the contour edge is broken into several sections. Thus, when such a disconnection is detected, step S316 is executed to perform an interpolation operation on the disconnected areas of the contour edge, so as to fill the disconnected parts. Specific operations of step S316 will be exemplarily described by referring to FIG. 5c in the following.

After step S316 is performed, method 300 obtains a fine face segmentation region in step S318, which is ready for use in image processing in the subsequent steps S320 and S322. It should be noted that the above descriptions of obtaining the coarse face segmentation region and calculating the face contour edge are merely exemplary, and those skilled in the art can adopt any other suitable methods for implementation.

After obtaining the fine face segmentation region, method 300 additionally "beautifies" the picture, including whitening processing in step S320 and smoothing processing in step S322. Firstly, in step S320, method 300 performs a whitening operation based on the fine face segmentation region. Specific operations of step S320 will be exemplarily described by referring to FIG. 6 in the following.

Next, in step S322, method 300 further performs the smoothing processing based on the fine face segmentation region. To this end, embodiments of the invention propose to adaptively smooth each pixel mainly based on local region information, so as to remove wrinkles or freckles on the forehead, cheeks of a face or neck, without weakening facial details such as the mouth, teeth and eyes. Specific operations of step S322 will be exemplarily described by referring to FIG. 7 in the following.

Method 300 is described above by referring to each step as shown in FIG. 3. However, it should be noted that the order of steps as shown in the flow chart is merely exemplary, while embodiments of the present invention are not limited thereto. In addition, relevant steps may be omitted regarding different face images. For example, although steps S312, S314 and S316 are described in sequence, when the coarse face segmentation region does not contain the conditions that need the processing in steps S312, S314 or S316, the corresponding steps may be omitted. In addition, steps S320 and S322 can be swapped. For example, the smoothing processing can be performed before the whitening processing. This can be selected and set according to, for example, user's preferences.

Figure 4:
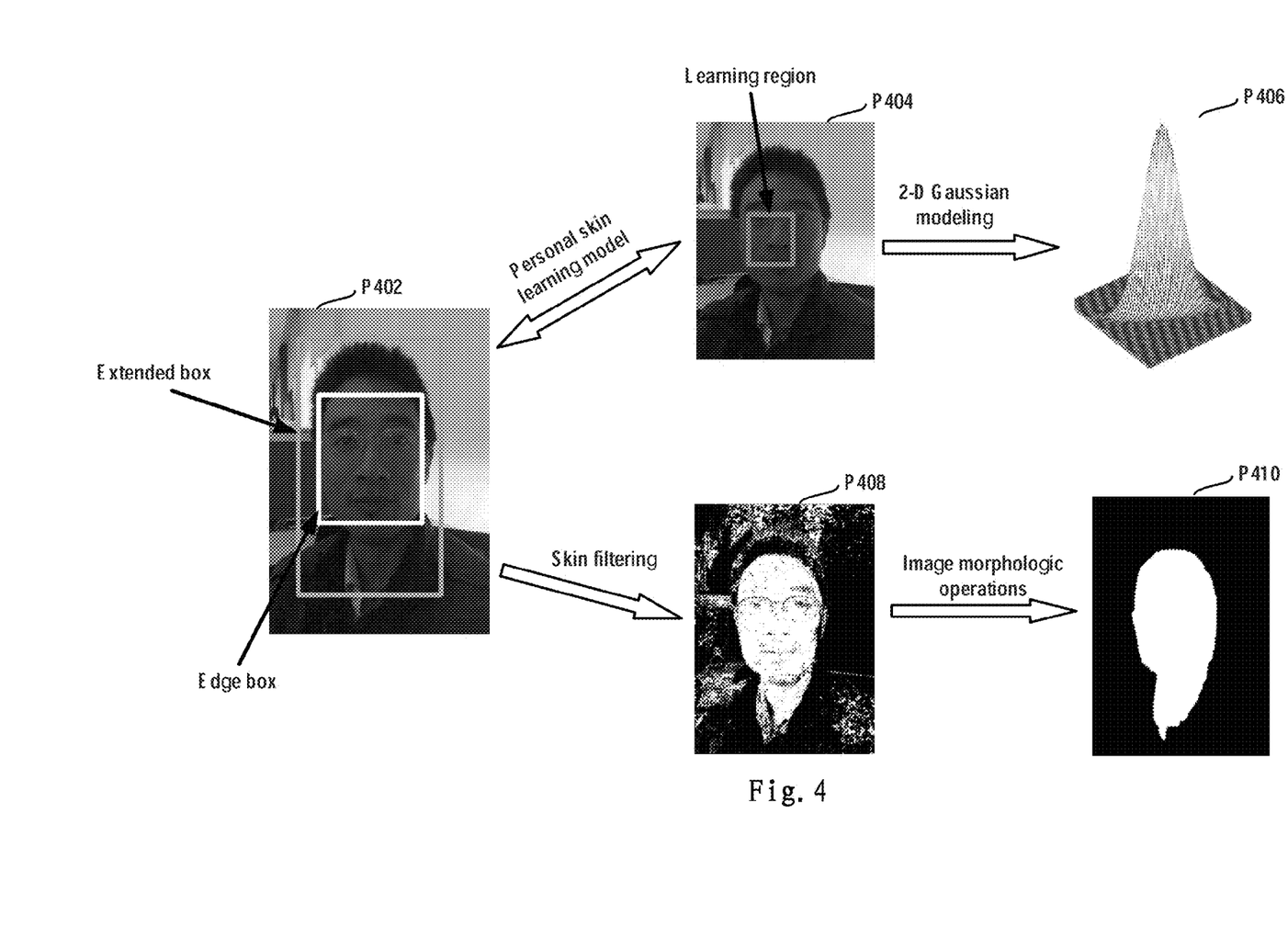
FIG. 4 is a schematic diagram exemplarily illustrating operations for obtaining a coarse face segmentation region according to an embodiment of the present invention.

FIG. 4 is a schematic diagram exemplarily illustrating an operation for obtaining coarse face region segmentation according to an embodiment of the present invention, comprising the skin color modeling and the coarse face segmentation.

As described in step S302 in the above method 300, an inner box surrounding the main face region of a man in picture P402 is the edge box (or referred to as a face detection box), and an outer box extended to include the neck of the man is the extended box. It can be seen that the extended box not only covers the whole face region, but also covers extra background regions, such as the background behind the man's face and collar in the extended box, and these background regions can be filtered out later by using the skin color model.

Detecting all types of faces using a general skin color model is neither practical nor feasible. To make the face segmentation relatively reliable, the present invention proposes to build a skin color model specific to each face, so as to obtain a more effective skin color model. As shown in FIG. 4, the present invention proposes that a fragment of the face region (as indicated in picture P404 in the upper part of FIG. 4) is picked up from the edge box obtained from the face image detection as a learning region for implementing a skin color model learning process in a UV color space of a color difference signal. For example, a corresponding skin distribution can be modeled by a 2D-Gaussian paramedic model, to obtain a 2D-Gaussian skin-color difference model as show in picture P406 in the right upper part of FIG. 4 (i.e., the skin color model of the present invention). The skin color model may be subsequently applied to filtering the facial skin region in the extended box in the left picture P402, so as to filter out the background image information, so that picture P408 as shown in the lower part of FIG. 4 is obtained. For better understanding, the modeling and filtering processes will be exemplarily described as follows.

As to each pixel p in the selected learning region, its corresponding color difference signal $c(p)=(u_p,v_p)$ is obtained by a color transform. Then, statistics of the color difference signals of all pixels within the learning region is taken to obtain an average value $m_{c(p)}$ and variance $\sigma_{c(p)}$ of the color difference signals, and thereby, a 2D-Gaussian skin color difference model $f(c(p))=N(c(p),m_{c(p)},\sigma_{c(p)})$ may be built, wherein N is 2D-Gaussian function with $m_{c(p)}$ as the average value and $\sigma_{c(p)}$ as the variance. Subsequently, as to the face image region in the extended box, a color difference signal $c(q)=(u_q,v_q)$ of each pixel q is calculated, and introduced into the skin color model obtained by the learning, namely, $f(c(q))=N(c(q),m_{c(p)},\sigma_{c(p)})$. If $f(c(q))$ is greater than a certain specific threshold value (such as a certain decimal between 0 and 1), it can be considered that the current pixel is the skin color. Otherwise, it is not considered as the skin color. Through the above operations, background image information can be filtered out, and a human face region can be roughly obtained.

Next, some image morphologic operations may be performed on the obtained picture P408, so that holes in picture P408 will be filled and noises will be removed, and picture P410 as illustrated in the lower right part of FIG. 4 is obtained. In other words, the coarse face segmentation region according to an embodiment of the present invention is obtained. It can be seen that during the coarse face region segmentation, embodiments of the present invention use skin information as a reliable cue to segment the face skin region from the extended box.

Figure 5A:
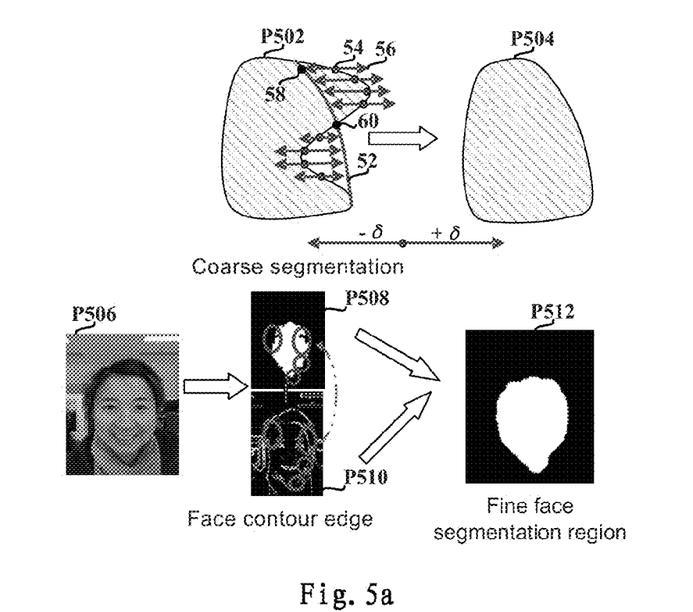
FIG. 5a-5c are schematic diagrams respectively illustrating performing refinement processing on a picture so as to obtain a fine face segmentation region according to different embodiments of the present invention.

FIG. 5a illustrates a process for refining the coarse face segmentation region of a picture according to an embodiment of the present invention, i.e. the processing in step S312 of method 300. As shown in FIG. 5a, region P502 illustrates the currently obtained coarse face segmentation region, and curve 52 indicates the contour edge of the face. It is easily seen from region P502 that the upper right area of the coarse face segmentation region out-stretches from the contour edge 52, while the lower right area retracts into the contour edge 52. Obviously, such face region segmentation is not precise.

Thus, embodiments of the invention propose that when the above two types of deviations are detected, a searching range may be set for pixels (as indicated by reference numeral 54) on the edge of the coarse face segmentation region. Supposing that pixel 54 has a two dimensional coordinate (x, y), the lateral searching range for it may be denoted as (x−δ, x+δ), which is shown as double head arrows 56 and 58 in FIG. 5a. Similarly, its longitudinal searching range may be denoted as (y−δ, y+δ) (not shown). Here, the value selection of parameter "δ" determines the weight of edge information during the refining process. The greater the value is, the more face contour edge points will be searched, while a smaller value may reduce the number of the found contour edge points. Thus, a suitable value may be selected via a lot of learning processes, so that unnecessarily expanding the searching range can be avoided, and over-reducing the searching range may also be avoided. Next, it may be detected, within the searching range, whether there is a point (also referred to as a strong edge response point, obtained in a RGB color space) on the face contour edge 52 in the lateral or longitudinal direction aligning with the pixel 54. If there is such a point, the pixel is adjusted to the position of the point on the face contour edge. For example, when it is detected that there is a point 58 corresponding to pixel 54 within its lateral searching space, namely, the space between arrows 56 and 58, and the point 58 is just located on the face contour edge 52, then the position of pixel 54 can be updated to the new point 58 now. If the detected pixel precisely overlaps with a point on the face contour edge, as the illustrated point 60 in the figure, then the position of the pixel will be kept unchanged. By the above position adjusting, a finer face segmentation region as illustrated by region P504 may be obtained.

For easy understanding, the refining process is illustrated with a real picture P506 in the lower part of FIG. 5a as an example. After the real picture P506 experiences the coarse face region segmentation and the face contour calculation as previously stated in the invention, pictures P508 and P510 are obtained respectively. It can be seen from regions surrounded by circles of different sizes in picture P508, a darker region in the face (such as eyebrows) is considered as a non-face region in the coarse face segmentation region. With the embodiments of the present invention, in picture P510, a contour edge corresponding to it can be found (shown by a circle). Next, the coarse segmented picture P508 may be processed with the above described adjusting manner. For example, the pixels retracting into the facial contour edge (such as eyebrows) may be adjusted to the points on the contour edge aligning with them in the lateral or longitudinal direction within the searching range, so that the fine face segmentation region as shown by picture P512 is obtained.

Figure 5B:
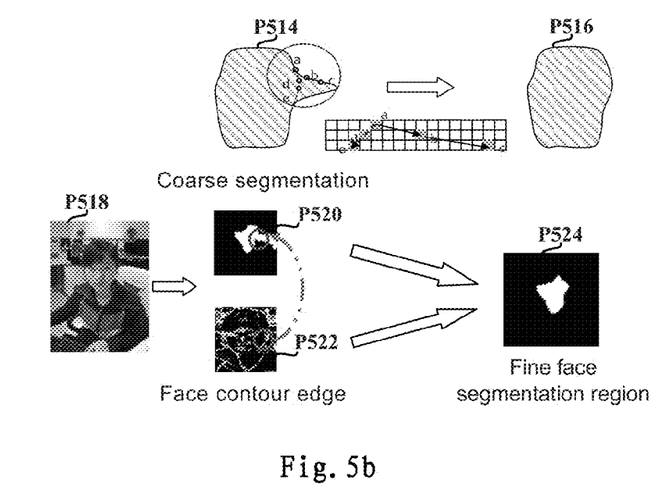

FIG. 5b illustrates a process for adjusting the coarse face segmentation region of a picture according to an embodiment of the invention, which is the processing in step S314 of method 300. As shown in FIG. 5b, region P514 shows the current coarse face segmentation region, having three points, a, b and c on its edge. While there are three other points, a, d and e on the face contour edge, wherein point a is a common point shared by the coarse face segmentation region and the face contour edge. It can be seen that within a neighboring area of point a, a steep spatial ranking is formed by a plurality of pixels (such as points b and c) on the edge of the coarse face segmentation region, and thus an obvious out-stretching protrusion is correspondingly formed. Spatial distances of |d-b| and |e-c| are much larger than the value of parameter δ, and thus the searching range method in FIG. 5a does not work currently for adjusting point b to the position of point d, and similarly, adjusting point c to the position of point e.

Further, by determining that deviations between points along the face contour edge are far smaller than those between pixels along the edge of the coarse segmentation region (for example, an mathematical expression may be |d-a|<<|b-a| and |e-a|<<|c-a|, as illustrated by a geometry block between regions P514 and P516), it can be determined that the out-stretching protrusion on the edge of the coarse face segmentation region should be retracted into the face contour edge, or be cut as the background region, so as to remove the out-stretching protrusion. Taking region P514 as an example, the face segmentation region should extend along the face contour edge points a, d and e, rather than the initial pixels a, b and c, so that the fine face segmentation region, i.e. P516, can be obtained.

Similarly, for better understanding, the refining process is illustrated by using real picture P518 in the lower part of FIG. 5b as an example. After the real picture P518 experiences the above coarse segmentation and the face contour calculation as previously stated in the invention, pictures P520 and P522 are obtained respectively. It can be seen from regions surrounded by circles of different sizes in picture P520, the background region behind the face (such as a seat having a similar color with the facial skin) is regarded as the face region in the coarse segmentation. With the embodiments of the present invention, the corresponding face contour edge in picture P522 (shown by a circle) can be calculated. Next, the coarsely segmented picture P520 may be processed with the above described adjusting manner. For example, the pixels obviously protruding from the face contour edge can be adjusted into the face contour edge, or cut out, so as to remove the redundant background region, and obtain the fine face segmentation region as illustrated in picture P524.

Figure 5C:
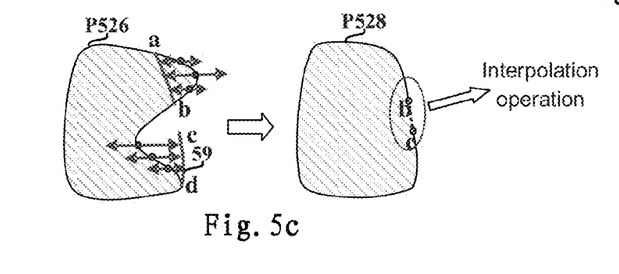

FIG. 5c illustrates a process for refining the coarse face segmentation region of a picture according to an embodiment of the present invention, which is the processing in step S316 of method 300. As indicated by region P526 in FIG. 5c, contour edge curve 59 is broken into two sections, ab and cd. When the coarse face segmentation region is adjusted according to the above method of the present invention, a blank region will be generated between the two end points b and c.

As stated above, after steps S312 and S314 of method 300, the coarse face segmentation region protruding from the ab section of the contour edge will be converged to the ab section. Similarly, the coarse face segmentation region retracting into the cd section of the contour edge will be converged to the cd section. On such a basis, it can be reasonably derived that the disconnected points b and c will be connected to make up the missing data in calculating the face contour. According to one embodiment of the present invention, considering that the trend of the contour between b and c points approaches to be straight, a linear interpolation technique may be used to calculate coordinates of a plurality of points between b and c, so as to achieve connection between b and c points. In addition, when the trend between the disconnected end points on the contour edge exhibits a curve, a non-linear interpolation technique, such as the bsline interpolation algorithm, may also be considered. After such an interpolation operation, a refined fine face segmentation region can be obtained as illustrated by region P528.

The above descriptions of the coarse face segmentation region adjustment with reference to FIGS. 5a-5c are mainly made for the lateral direction. As mentioned above, the above adjusting method may also be applicable to the adjustment in the longitudinal direction. In a word, the embodiments of the present invention are respectively performed in the lateral and longitudinal directions on an image through such a refinement process, so as to obtain the fine face segmentation region.

FIG. 6 is a schematic diagram exemplarily illustrating whitening (i.e. the processing in step S320 of method 300) a face by using the fine face segmentation region obtained according to an embodiment of the present invention.

After the fine face segmentation region as illustrated by pictures P512 and P524 in FIG. 5 is obtained, it is highly possible to perform the whitening processing on the region so as to make the face clear, beautiful and easy to recognize and identify. Generally, the most direct method is to increase the level of the luminance cue Y for all pixels within the region by the same magnitude. However, such a method will directly reduce the contrast of the face, so that details (such as the mouth, teeth and eyes) of the face will be blurred. It is not good for the beautification of the face. In addition, the whitening processing of the face should have a number of adjustable levels, so that users may obtain a plurality of different whitening effects. Thus, embodiments of the present invention proposes to take statistics of grey values for the fine face segmentation region, divide the face region into several different levels based on the statistics, and perform different levels of whitening operations on the different levels, so as to obtain different whitening effects.

To achieve the above effect, an embodiment of the present invention proposes a facial skin whitening function as follows:

$$f(x) = \begin{cases} \left(1 - \exp\left(\frac{-x}{thres}\right)\right) \cdot thres, & 0 \le x \le thres \\ \frac{255 - f(thres)}{level - thres} \cdot (x - thres) + f(thres), & thres < x \le 255 \end{cases} \quad (1)$$

In the above function, "x" represents the grey value of a certain pixel, "thres" represents a parameter for dividing a space constituted of all pixels x into multiple sections. For example, as illustrated by a left curve of FIG. 6, grey levels of an image are divided into section A and section B. The selection of "thres" may be adaptively learned from the face image to be processed. For example, grey values of all pixels within the face region are ranked in a descending order, and grey values of the pixels within the last 5% are averaged and the obtained average value is set as the value of "thres". These 5% data are generally collected from eyes, eyebrows or beards of the face. The value of another parameter "level" is adjustable from "thres+1" to 255 to obtain whitening curves of different levels (such as multiple curves shown in B section of the curve picture in FIG. 6) so as to realize different whitening effects. As shown in pictures P606, P608 and P610 in FIG. 6, with the increase of the level, the contrast of the picture subject to the whitening processing gradually increases and the definition is also significantly improved comparing with the original picture P604.

Figure 7:
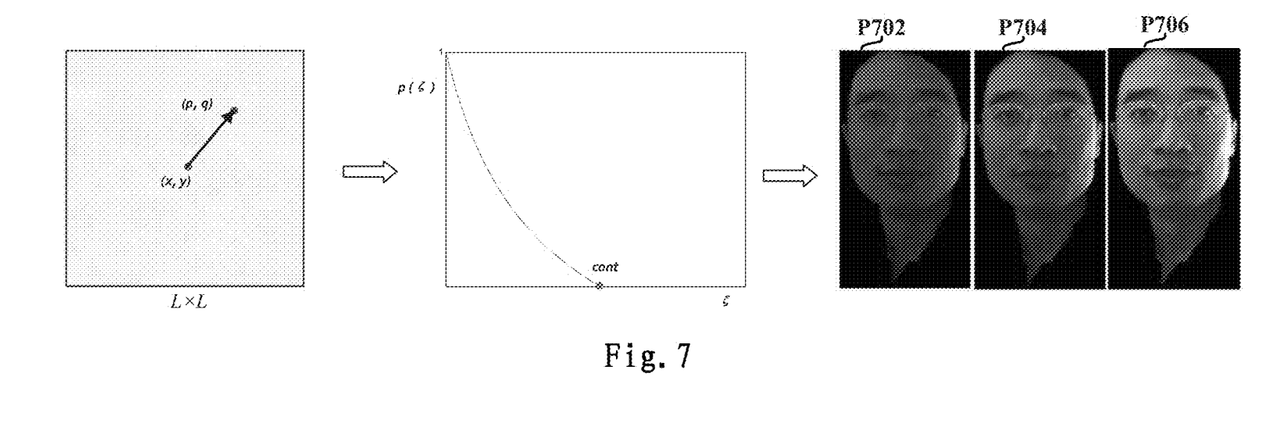
FIG. 7 is a schematic view exemplarily illustrating performing smoothing processing on a face using the fine face segmentation region obtained according to an embodiment of the present invention.

FIG. 7 is a schematic diagram exemplarily illustrating performing the smoothing processing (i.e. the processing in step S322 of method 300) on a face by using the fine face segmentation region obtained according to an embodiment of the present invention.

Firstly, the embodiment of the present invention takes statistics of gradient magnitudes of all pixels within a face region. Next, the gradient magnitudes are ranked in a descending order, and the first 10% of data is averaged to obtain a constant parameter "cont", which may be regarded as a coarse measurement of the strength of useful face details. Subsequently, as illustrated in the left side of FIG. 7, for each pixel (x, y) within the fine face segmentation region, a region box with a size of L*L and centered at the pixel is selected, where L may be a suitable integer. Then, a spatial distance Δ between any pixel (such as pixel (p, q)) in a neighboring area and this central pixel (x, y) is calculated, for example, as $\Delta = |(p, q) - (x, y)|$. Subsequently, their grey difference ζ is calculated, for example, as $\zeta = |g(p, q) - g(x, y)|$. The grey difference ζ is mainly used for determining weight p(ζ) for smoothing the pixel (x, y), and the weight p(ζ) can be calculated by, for example, the following equation:

$$p(\zeta) = a + \frac{b}{\zeta + c} \quad (2)$$

Based on the curve relationship between ζ and p(ζ) as illustrated in the middle of FIG. 7, parameters a, b and c in equation (2) determine the steepness of the curve. It can be seen from the curve relationship as shown in the middle of FIG. 7 that when the grey difference ζ is greater than cont, the curve will converge to the cont value, which means that an edge might exist between the pixel (x, y) and the pixel (p, q). The pixel (p, q) will not contribute any weight to the smoothing of the pixel (x, y). Based on this rule, the grey value of the pixel (x, y) may be updated by using the following equation and based on a local weighting mechanism:

$$g_{new}(x, y) = \frac{\sum_{p,q} f(\Delta) \cdot p(\zeta) \cdot g(p, q)}{\sum_{p,q} f(\Delta) \cdot p(\zeta)} \quad (3)$$

wherein g(p,q) represents the current grey value of pixel (x, y), $g_{new}(x, y)$ represents the updated grey value of pixel (x, y) (i.e., the value after the smoothing), f(Δ) is a Gaussian function to give a larger weight to a closer pixel, and its function form is $$f(\Delta) = \exp\left(-\frac{\Delta^2}{\sigma^2}\right),$$

wherein the value of σ is proportional to L.

Pictures P702, P704 and P706 in FIG. 7 illustrate the effects obtained after pictures P606, P608 and P610 in FIG. 6 are respectively smoothed when a=−0.6, b=14.4 and c=9. It can be seen from pictures P702, P704 and P706 that after the above processing, the face looks smoother, and undesired wrinkles and freckles in the picture are filtered out.

Figure 8:
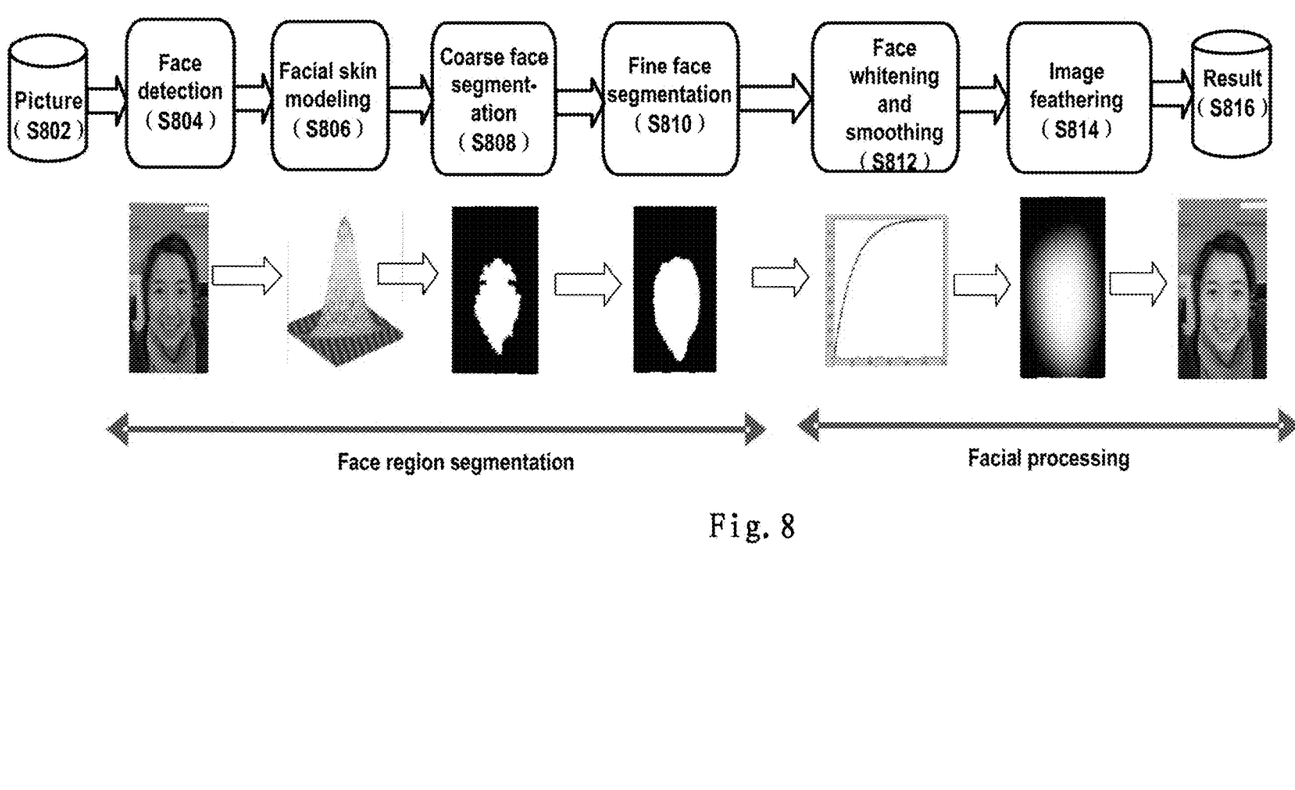
FIG. 8 is a flow chart exemplarily illustrating a whole process for facial image processing according to an embodiment of the present invention in connection with a specific image processing process.

FIG. 8 is a flow chart exemplarily illustrating a whole process 800 for face image processing according to an embodiment of the present invention in connection to a specific image processing process. As shown in FIG. 8, in step S802, pictures or photos to be processed are obtained, where the pictures or photos may be captured by a handheld device with a shooting function. Next, in step S804, a face in the picture is detected or identified. In step S806, a face skin is modeled, for example, by performing the operation illustrated in step S304 of FIG. 3. Subsequently, in step S808, coarse face region segmentation is performed on a face region, for example, by performing the operation illustrated in step S306 of FIG. 3. Further, fine face segmentation is performed in step S810, for example, by performing operations illustrated in steps S308, S310, S312, S314 and S316 of FIG. 3. Till now, the segmentation of the face region according to the embodiments of the present invention is completed. Next, flow 800 proceeds to the face processing phase, which includes whitening and smoothing the fine face segmentation region in step S812, for example, by performing operations in steps S320 and S322 of FIG. 3. Next, a feathering operation (S814) can be selectively performed on the processed picture, so as to enable the edge of the picture to have a twilight effect. The result may be output in step S816 at the end. For example, the final processed pictures or photos may be displayed to a user on a handheld device, and thereby the user may share them with friends or upload and release them via a network.

Figure 9:
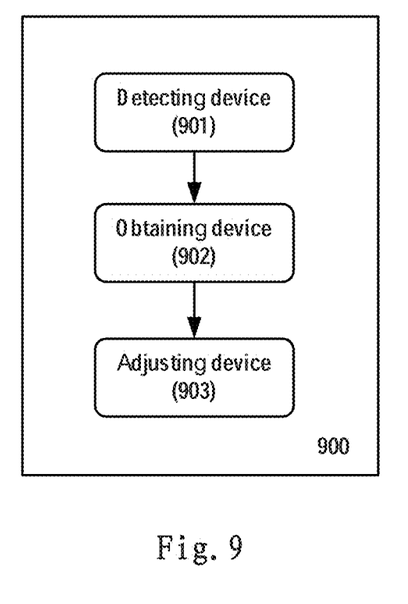
FIG. 9 is a block diagram exemplarily illustrating an apparatus capable of implementing embodiments of the present invention.

FIG. 9 is a block diagram exemplarily illustrating an apparatus 900 capable of implementing the embodiments of the present invention. As shown in FIG. 9, the apparatus 900 comprises a detecting device 901, an obtaining device 902, and an adjusting device 903. In the apparatus 900, the detecting device 901 is used for performing face detection of an image, the obtaining device 902 is used for obtaining a coarse face segmentation region of at least one face and a contour edge of the at least one face based on the face detection, and the adjusting device 903 is used for adjusting the coarse face segmentation region based on the contour edge to obtain a fine face segmentation region. It can be seen that various devices in the apparatus 900 can perform corresponding steps in methods 200 and 300, so as to obtain the fine face segmentation region. Although not shown, the apparatus 900 can additionally comprise a device for whitening and smoothing a face image based on the fine face segmentation region, such as performing the operations previously described by referring to FIGS. 6 and 7.

Figure 10:
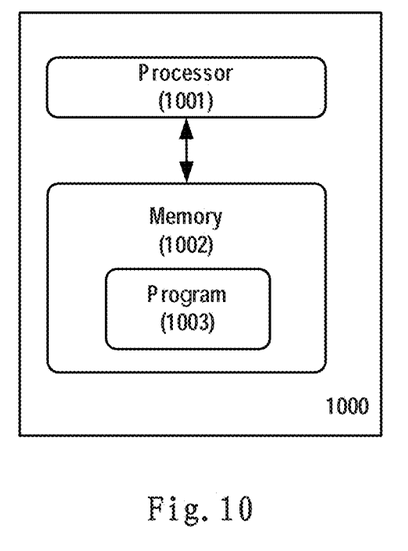
FIG. 10 is a block diagram exemplarily illustrating another apparatus for implementing embodiments of the present invention.

FIG. 10 is a block diagram exemplarily illustrating another apparatus 1000 for implementing the embodiments of the present invention. As shown in FIG. 10, the apparatus 1000 may comprise at least one processor 1001 and at least one memory 1002 containing computer program code 1003. The processor 1001 and the memory 1002 are configured to, with the processor 1001, cause the apparatus 1000 to perform corresponding steps in methods 200 and 300, so as to obtain the fine face segmentation region. In addition, the processor 1001 and the memory 1002 are further configured to, with the processor 1001, cause the apparatus 1000 to perform the operations previously described with reference to FIGS. 6 and 7, so as to whiten and smooth the fine face segmentation region.

Although FIGS. 9 and 10 exemplarily illustrate in a form of block diagram the apparatuses according to the embodiments of the present invention, it can be understood that the apparatuses of the present invention can be implemented as or integrated into any electronic device with an image capturing function, including but not limited to various kinds of smart phones with a camera function, a desktop computer, laptop and flat computer with a camera, and an electronic device for collecting and processing a face image. In addition, the apparatuses of the present invention can also be implemented as an electronic device for merely performing face processing on images captured by any other arbitrary electronic devices and providing the processed face image to the same.

Exemplary embodiments of the present invention are described by referring to the flow charts and block diagrams as shown in the above Figures. It should be explained that the methods as disclosed in the embodiments of the present invention can be implemented in software, hardware or the combination of software and hardware. The hardware part may be implemented using specific logic; while the software part may be stored in memory and executed by a suitable instruction executing system, such as a microprocessor or personal computer (PC). In some embodiments, the present invention is implemented as software, including but not limited to firmware, resident software, microcode and the like.

In addition, the embodiments of the present invention can also take the form of a computer program product accessible from a computer usable or readable medium, where the medium provides program code for use by a computer or any instruction executing system, or in combination with the computer or any instruction executing system. For the sake of description, the computer usable or readable medium can be any tangible device that may comprise, store, communicate, broadcast or transmit programs so as to be used by an instruction executing system, apparatus or device, or in combination with the same.

The medium may be an electric, magnetic, optical, electromagnetic, infrared, or semi-conductive system (or apparatus or device), or transmission medium. Examples of the computer readable medium include semi-conductor or solid memory, cassette, removable disk, random access memory (RAM), read-only memory (ROM), hard disk and optical disk. Currently, examples of optical disk comprise compact disk-read-only memory (CD-ROM), compact disk-read/write (CD-R/W) and DVD.

It should be noted that the description of the invention is provided for illustration and description, rather than exhausting or restricting the invention as the disclosed form. For those skilled in the art, a plurality of alterations and modifications are allowed. Thus, selecting and describing the embodiments are directed to better explaining the principle and practical applications of the invention, and enabling those skilled in the art to understand that without departing from the spirit of the present invention, all modifications and variations fall into the protection scope of the invention as limited by the appended claims.

The invention claimed is:

1. A method, comprising:
performing face detection of an image;
obtaining a coarse face segmentation region of at least one face and a contour edge of the at least one face based on the face detection;
searching the contour edge within a preset position adjusting range in a lateral or longitudinal direction to locate a plurality of updated contour edge points, wherein the preset position adjusting range is based upon a two dimensional coordinate of (x,y) and includes a lateral search range of (x−δ, x+δ) and a longitudinal search range of (y−δ, y+δ), wherein δ varies from one two dimensional coordinate to another, and wherein δ is selected so as to define a weight of contour edge information; and
adjusting the coarse face segmentation region based on the contour edge, the weight of the contour edge information as defined by δ, and the plurality of updated contour edge points to obtain a fine face segmentation region.

2. The method of claim 1, wherein said obtaining a coarse face segmentation region of at least one face comprises:
building a skin color model by using a partial region of the at least one face; and applying the skin color model to the at least one face to obtain the coarse face segmentation region of the at least one face.

3. The method of claim 1, wherein the contour edge of the at least one face is obtained by using a wavelet transform.

4. The method of claim 1, wherein said adjusting the coarse face segmentation region based on the contour edge to obtain a fine face segmentation region comprises:
adjusting the coarse face segmentation region along at least one of the lateral direction and the longitudinal direction with the contour edge as a reference, so as to fill the whole contour with the coarse face segmentation region.

5. The method of claim 4, wherein said adjusting the coarse face segmentation region comprises:
detecting whether edge pixels of the coarse face segmentation region deviate from the contour edge within the preset position adjusting range; and
when detecting that the deviation is within the position adjusting range, adjusting the deviated edge pixels to points on the contour edge aligning with these pixels in the lateral or longitudinal direction.

6. The method of claim 5, further comprising:
detecting whether the edge pixels are protruding outward from the contour edge and exceeding the position adjusting range; and
when detecting that the protrusion exceeds the position adjusting range, removing a portion of the coarse face segmentation region protruding from the contour edge.

7. The method of claim 6, further comprising:
detecting whether the contour edge is disconnected; and
when detecting that the contour edge is disconnected, performing an interpolation operation between the disconnected two end points.

8. The method of claim 1, further comprising:
determining grey values of all pixels within the fine face segmentation region;
dividing all pixels into at least two classes based on the grey values; and
adjusting the grey values of each class of pixels according to different levels, so as to realize whitening processing on the fine face segmentation region.

9. The method of claim 8, wherein said dividing all pixels into at least two classes based on the grey values comprises:
taking statistics of the grey values of all pixels within the fine face segmentation region;
determining at least one threshold value for the grey values based on the statistics; and
dividing all pixels into at least two classes based on the at least one threshold value.

10. The method of claim 9, wherein said determining at least one threshold value for the grey values comprises:
ranking the grey values of all pixels;
selecting a predetermined number of pixels in sequence; and
averaging the grey values of the selected pixels to determine the at least one threshold value.

11. The method of claim 8, further comprising:
selecting a plurality of different levels for each class of pixels for the adjustment, so as to realize the whitening processing with a plurality of corresponding different effects.

12. The method of claim 1, further comprising:
determining grey value differences between each pixel within the fine face segmentation region and respective neighboring pixels in a neighboring region;
comparing each of the grey value differences with the predetermined threshold value to determine smoothing weights of the each pixel over respective neighboring pixels, wherein the smoothing weight is inversely proportional to the grey value difference; and
adjusting the grey value of the each pixel based on the grey values and the smoothing weights of the respective neighboring pixels, and spatial distances between the respective neighboring pixels and the each pixel, so as to realize smoothing processing on the fine face segmentation region.

13. The method of claim 12, wherein the predetermined threshold value is obtained by the following operations:
calculating gradient values of all pixels within the fine face segmentation region;
ranking the gradient values of all pixels;
selecting a predetermined number of pixels in sequence; and
averaging the gradient values of the selected pixels to obtain the predetermined threshold value.

14. An apparatus, comprising:
at least one processor and at least one memory containing computer program code;
the processor and the memory are configured to, with the processor, cause the apparatus to at least:
perform face detection of an image;
obtain a coarse face segmentation region of at least one face and a contour edge of the at least one face based on the face detection;
search the contour edge within a preset position adjusting range in a lateral or longitudinal direction to locate a plurality of updated contour edge points, wherein the preset position adjusting range is based upon a two dimensional coordinate of (x, y) and includes a lateral search range of (x−δ, x+δ) and a longitudinal search range of (y−δ, y+δ), wherein δ varies from one two dimensional coordinate to another, and wherein δ is selected so as to define a weight of contour edge information; and
adjust the coarse face segmentation region based on the contour edge, the weight of the contour edge information as defined by δ, and the plurality of updated contour edge points to obtain a fine face segmentation region.

15. The apparatus of claim 14, wherein the processor and the memory are configured to, with the processor, cause the apparatus to at least:
build a skin color model by using a partial region of the at least one face; and
apply the skin color model to the at least one face to obtain the coarse face segmentation region of the at least one face.

16. The apparatus of claim 14, wherein the contour edge of the at least one face is obtained by using a wavelet transform.

17. The apparatus of claim 14, wherein the processor and the memory are configured to, with the processor, cause the apparatus to at least:
adjust the coarse face segmentation region along at least one of the lateral direction and the longitudinal direction with the contour edge as a reference, so as to fill the whole contour with the coarse face segmentation region.

18. The apparatus of claim 17, wherein the processor and the memory are configured to, with the processor, cause the apparatus to at least:

detect whether edge pixels of the coarse face segmentation region deviate from the contour edge within the preset position adjusting range; and when detecting that the deviation is within the position adjusting range, adjust the deviated edge pixels to points on the contour edge aligning with these pixels in the lateral or longitudinal direction.

19. The apparatus of claim 18, wherein the processor and the memory are configured to, with the processor, cause the apparatus to further:

detect whether the edge pixels are protruding outward from the contour edge and exceeding the position adjusting range; and when detecting that the protrusion exceeds the position adjusting range, remove a portion of the coarse face segmentation region protruding from the contour edge.

20. The apparatus of claim 19, wherein the processor and the memory are configured to, with the processor, cause the apparatus to further:

detect whether the contour edge is disconnected; and when detecting that the contour edge is disconnected, perform an interpolation operation between the disconnected two end points.

21. The apparatus of claim 14, wherein the processor and the memory are configured to, with the processor, cause the apparatus to further:

determine grey values of all pixels within the fine face segmentation region;

divide all pixels into at least two classes based on the grey values; and adjust the grey values of each class of pixels according to different levels, so as to realize whitening processing on the fine face segmentation region.

22. The apparatus of claim 21, wherein the processor and the memory are configured to, with the processor, cause the apparatus to at least:

take statistics of the grey values of all pixels within the fine face segmentation region;

determine at least one threshold value for the grey values based on the statistics;

divide all pixels into at least two classes based on the at least one threshold value.

23. The apparatus of claim 22, wherein the processor and the memory are configured to, with the processor, cause the apparatus to at least:

rank the grey values of all pixels;

select a predetermined number of pixels in sequence; and average the grey values of the selected pixels to determine the at least one threshold value.

24. The apparatus of claim 21, wherein the processor and the memory are configured to, with the processor, cause the apparatus to at least:

select a plurality of different levels for each class of pixels for the adjustment, so as to realize the whitening processing with a plurality of corresponding different effects.

25. The apparatus of claim 14, wherein the processor and the memory are configured to, with the processor, cause the apparatus to further:

determine grey value differences between each pixel within the fine face segmentation region and respective neighboring pixels in a neighboring region;

compare each of the grey value differences with the predetermined threshold value to determine smoothing weights of the each pixel over respective neighboring pixels, wherein the smoothing weight is inversely proportional to the grey value difference; and adjust the grey value of the each pixel based on the grey values and the smoothing weights of the respective neighboring pixels, and spatial distances between the respective neighboring pixels and the each pixel, so as to realize smoothing processing on the fine face segmentation region.

26. The apparatus of claim 25, wherein the processor and the memory are configured to, with the processor, cause the apparatus to obtain the predetermined threshold value by performing at least the following operations:

computing gradient values of all pixels within the fine face segmentation region;

ranking the gradient values of all pixels;

selecting a predetermined number of pixels in sequence; and averaging the gradient values of the selected pixels to obtain the predetermined threshold value.

27. A non-transitory computer program product comprising at least one computer-readable storage medium having computer-executable program code portions stored therein, the computer-executable program code portions comprising:

program code instructions causing performing face detection of an image;

program code instructions causing obtaining a coarse face segmentation region of at least one face and a contour edge of the at least one face based on the face detection;

program code instructions causing searching the contour edge within a preset position adjusting range in a lateral or longitudinal direction to locate a plurality of updated contour edge points, wherein the preset position adjusting range is based upon a two dimensional coordinate of (x, y) coarse face segmentation region and includes a lateral search range of (x−δ, x+δ) and a longitudinal search range of (y−δ, y+δ), wherein δ varies from one two dimensional coordinate to another, and wherein δ is selected so as to define a weight of contour edge information; and program code instructions causing adjusting the coarse face segmentation region based on the contour edge, the weight of the contour edge information as defined by δ, and the plurality of updated contour edge points to obtain a fine face segmentation region.

* * * * *

UNITED STATES PATENT AND TRADEMARK OFFICE
CERTIFICATE OF CORRECTION

PATENT NO. : 9,754,153 B2
APPLICATION NO. : 14/086235
DATED : September 5, 2017
INVENTOR(S) : Li et al.

It is certified that error appears in the above-identified patent and that said Letters Patent is hereby corrected as shown below:

In the Claims

Column 18,
Line 44, "(x, y) coarse face segmentation region" should read --(x, y)--.

Signed and Sealed this
Tenth Day of April, 2018

Andrei Iancu
*Director of the United States Patent and Trademark Office*